(12) United States Patent
Huang (10) Patent No.: US 12,502,857 B2
(45) Date of Patent: Dec. 23, 2025

(54) TIRE POST-INFLATION DEVICE (71) Applicant: ARP TECHNOLOGIES (SUZHOU) CO., LTD, Jiangsu (CN)

(72) Inventor: Guiqiang Huang, Jiangsu (CN)

(73) Assignee: ARP Technologies (Suzhou) Co., Ltd, Jiangsu (CN)

( * ) Notice: Subject to any disclaimer, the term of this patent is extended or adjusted under 35 U.S.C. 154(b) by 45 days.

(21) Appl. No.: 18/687,273

(22) PCT Filed: Oct. 12, 2023

(86) PCT No.: PCT/CN2023/124251
§ 371 (c)(1),
(2) Date: Feb. 27, 2024

(87) PCT Pub. No.: WO2024/114123
PCT Pub. Date: Jun. 6, 2024

(65) Prior Publication Data
US 2025/0121571 A1    Apr. 17, 2025

(30) Foreign Application Priority Data

Nov. 30, 2022 (CN) .......................... 202223190243.5

(51) Int. Cl.
*B29D 30/06* (2006.01)
(52) U.S. Cl.
CPC ................ *B29D 30/0643* (2013.01)
(58) Field of Classification Search
CPC ................................ B29D 30/0643
USPC ....................................... 425/28.1
See application file for complete search history.

(56) References Cited

U.S. PATENT DOCUMENTS

| 3,172,243 A * | 3/1965 | Laube ................ B29D 30/0633 |
| | | 451/28 |
| 2016/0096336 A1 | 4/2016 | Singh et al. |

FOREIGN PATENT DOCUMENTS

| CN | 204222047 U | 3/2015 |
| CN | 106273588 A | 1/2017 |
| CN | 208133653 U | 11/2018 |
| CN | 110293700 A | 10/2019 |
| CN | 113733621 A | 12/2021 |
| CN | 218838716 U | 4/2023 |
| DE | 102015016882 A | 6/2017 |

(Continued)

OTHER PUBLICATIONS

Yao N, CN 110293700 A, machine translation. (Year: 2019).*

(Continued)

*Primary Examiner* — Sedef E Paquette
(74) *Attorney, Agent, or Firm* — ArentFox Schiff LLP (57) ABSTRACT

Provided is a tire post-inflation device. The tire post-inflation device includes a framework, a lifting rod, a chuck assembly, lifting drive cylinders, and a pressing assembly. The lifting rod is disposed on the framework. The chuck assembly is connected to the lower end of the lifting rod. The chuck assembly is formed with an inflation port for inflating a tire. The lifting drive cylinders are disposed on two sides of the lifting rod. The lifting drive cylinders are configured to drive the lifting rod to move up and down. The pressing assembly is disposed on the framework. The pressing assembly includes a pressing rod and a drive assembly. The drive assembly is configured to drive the pressing rod to press the lifting rod that is lowered into place.

6 Claims, 7 Drawing Sheets

(56) References Cited

FOREIGN PATENT DOCUMENTS

| | | |
|---|---|---|
| JP | 63-221017 A | 9/1988 |
| WO | 2018/131087 A1 | 7/2018 |

OTHER PUBLICATIONS

International Search Report dated Oct. 12, 2023 from corresponding PCT Application No. PCT/CN2023/124251.
Communication dated Apr. 22, 2025, from the Japanese Patent Office in application No. 2024-519527.

\* cited by examiner

TIRE POST-INFLATION DEVICE

CROSS REFERENCE TO RELATED APPLICATION(S)

This application is a National Stage application filed under 35 U.S.C. 371 based on International Patent Application No. PCT/CN2023/124251, filed on Oct. 12, 2023, which claims priority to Chinese Patent Application 202223190243.5, filed with the China National Intellectual Property Administration (CNIPA) on Nov. 30, 2022, the disclosures of both of which are incorporated herein by reference in their entireties.

TECHNICAL FIELD

The present application relates to the field of tire post-inflation technology, for example, a tire post-inflation device.

BACKGROUND

Figure 8:
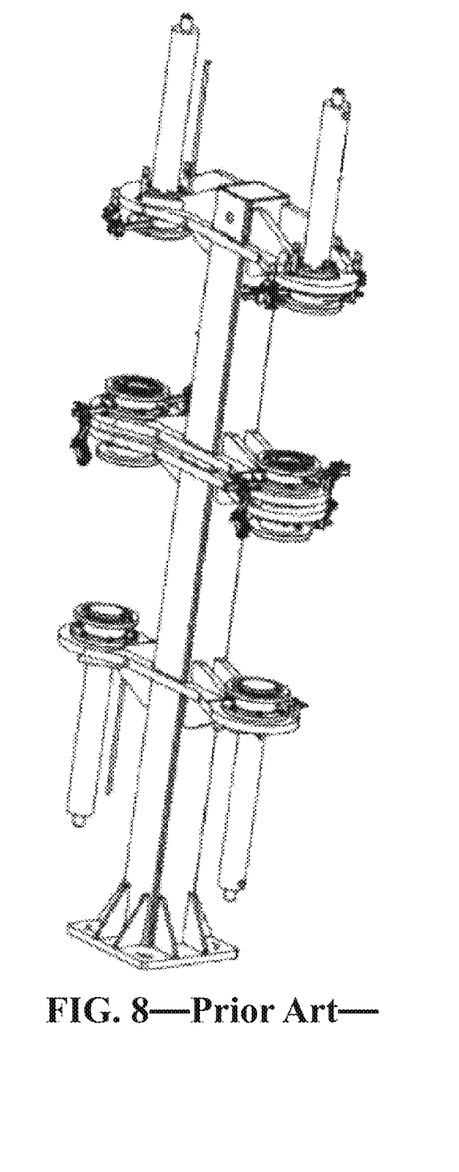
FIG. 8 is a view of a pressed oil cylinder in the related art.

Post-inflation is an important process in tire production to solve the thermal shrinkage and deformation of a tire. As the main auxiliary equipment of a vulcanizer, a post-inflation device is connected behind the vulcanizer. The tire is vulcanized and is shaped and cooled on the post-inflation device, and the size of the outer edge of the tire is ensured. During the inflation process, the tire may have a large expansion force, and an oil cylinder or air cylinder is usually used for pressing. As shown in FIG. 8, to maintain the pressing force, a large-sized oil cylinder is required for pressing, which is not only large in the volume but also may cause oil leakage.

SUMMARY

The present application provides a tire post-inflation and pressing device. The device can press and maintain the tire during the inflation process, and the pressure on a lifting drive cylinder is reduced. A relatively small lifting drive cylinder may be used to satisfy practical requirements, reduce oil leakage or air leakage, and prolong the practical life of the lifting drive cylinder.

The present application discloses a tire post-inflation device. The device includes a framework, a lifting rod, a chuck assembly, lifting drive cylinders, and a pressing assembly. The lifting rod is disposed on the framework. The chuck assembly is connected to the lower end of the lifting rod. The chuck assembly is formed with an inflation port for inflating the tire. The lifting drive cylinders are disposed on two sides of the lifting rod. The lifting drive cylinders are configured to drive the lifting rod to move up and down.

The pressing assembly is disposed on the framework. The pressing assembly includes a pressing rod and a drive assembly. The drive assembly is configured to drive the pressing rod to press the lifting rod that is lowered into place.

The reference numbers involved in the drawings are as follows:

1 framework
11 beam
2 lifting rod
21 lifting drive cylinder
3 chuck assembly
31 inflation port
4 pressing rod
41 mounting base
42 guide sleeve
51 slide rail
52 pulling air cylinder
61 motor
62 driving gear
63 driven gear
71 mounting plate
72 moving air cylinder
73 pressing plate
74 through hole
75 lower pressing surface

DETAILED DESCRIPTION

The present application may be described in further detail with reference to the drawings.

As shown in FIGS. 1 to 6, the present application discloses a tire post-inflation device. The device includes a frame 1 and a pressing assembly. A lifting rod 2 is disposed on the framework 1. A chuck assembly 3 is connected to the lower end of the lifting rod 2. The chuck assembly 3 is formed with an inflation port 31 for inflating a tire. The lifting drive cylinders 21 are disposed on two sides of the lifting rod 2. The lifting drive cylinders 21 are configured to drive the lifting rod 2 to move up and down. A lifting drive cylinder may be an air cylinder or an oil cylinder.

The pressing assembly is disposed on the framework 1. The pressing assembly includes a pressing rod 4 and a drive assembly. The drive assembly is configured to drive the pressing rod 4 to press the lifting rod 2 that is lowered into place.

The benefits of adopting the preceding technical solutions are that the pressing assembly is configured to press the lifting rod 2 and keep the position unchanged, so that the pressure on the lifting drive cylinder 21 is reduced; and a relatively small lifting drive cylinder 21 may be used to satisfy use requirements, reduce oil leakage or air leakage, and prolong the service life of the lifting drive cylinder 21.

Figure 4:
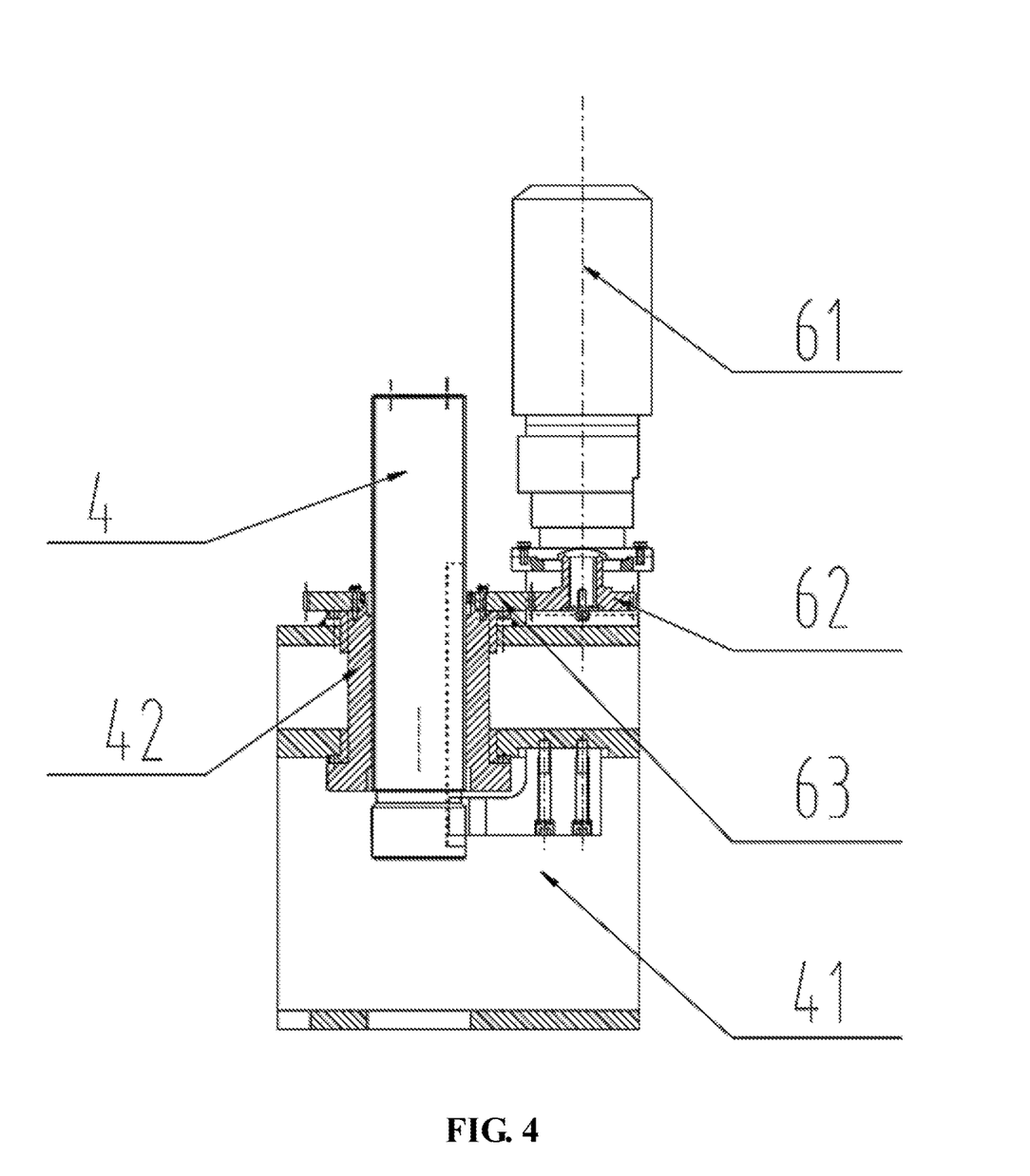
FIG. 4 is a front view illustrating the structure of a pressing assembly according to an embodiment of the present application.
Figure 5:
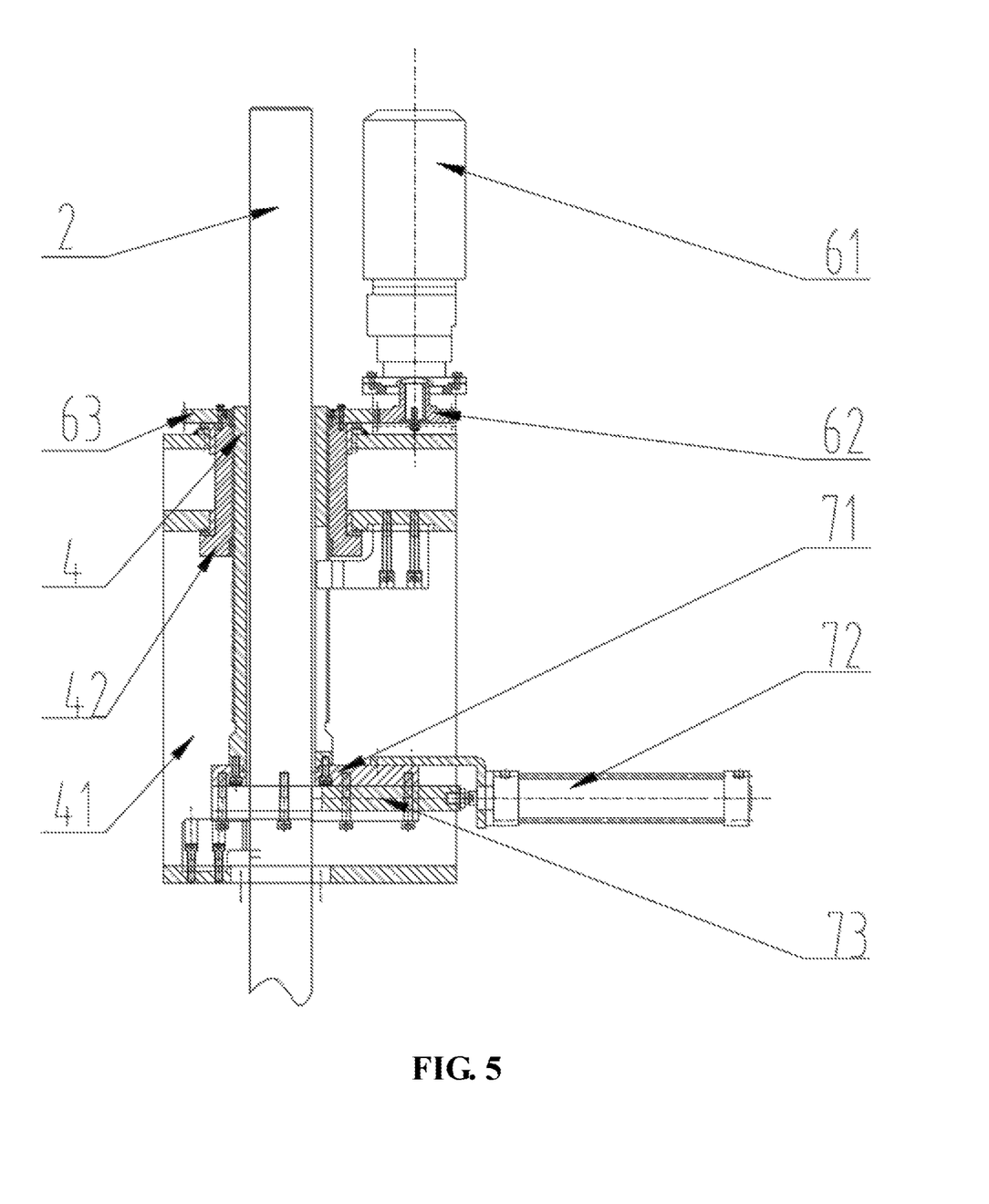
FIG. 5 is a front view illustrating the structure of the pressing assembly when a pressing rod is hollow according to an embodiment of the present application.

As shown in FIGS. 4 and 5, in some embodiments, the pressing assembly may adopt the following structure scheme. The pressing assembly includes a mounting base 41 and a guide sleeve 42. The mounting base 41 is disposed on the framework 1. The mounting base 41 is formed with a mounting hole. A bearing is disposed in the mounting hole.

The guide sleeve 42 is disposed in the bearing on the mounting base 41. The guide sleeve 42 is provided with threads. The pressing rod 4 is disposed in the guide sleeve 42. The pressing rod 4 is provided with threads that match the guide sleeve 42. The drive assembly drives the guide sleeve 42 to rotate to enable the pressing rod 4 to move up and down in the guide sleeve 42.

The benefits of adopting the preceding technical solutions are that the pressing rod 4 is disposed in the guide sleeve 42 and is connected to the guide sleeve 42 through threads; under the control of the drive assembly, the guide sleeve 42 rotates, and the pressing rod 4 may be lowered in the guide sleeve 42; and through the cooperation between the pressing rod 4 and the guide sleeve 42, the lifting rod 2 is pressed and kept in the same position, so that the pressure on the lifting drive cylinder 21 is reduced.

Figure 1:
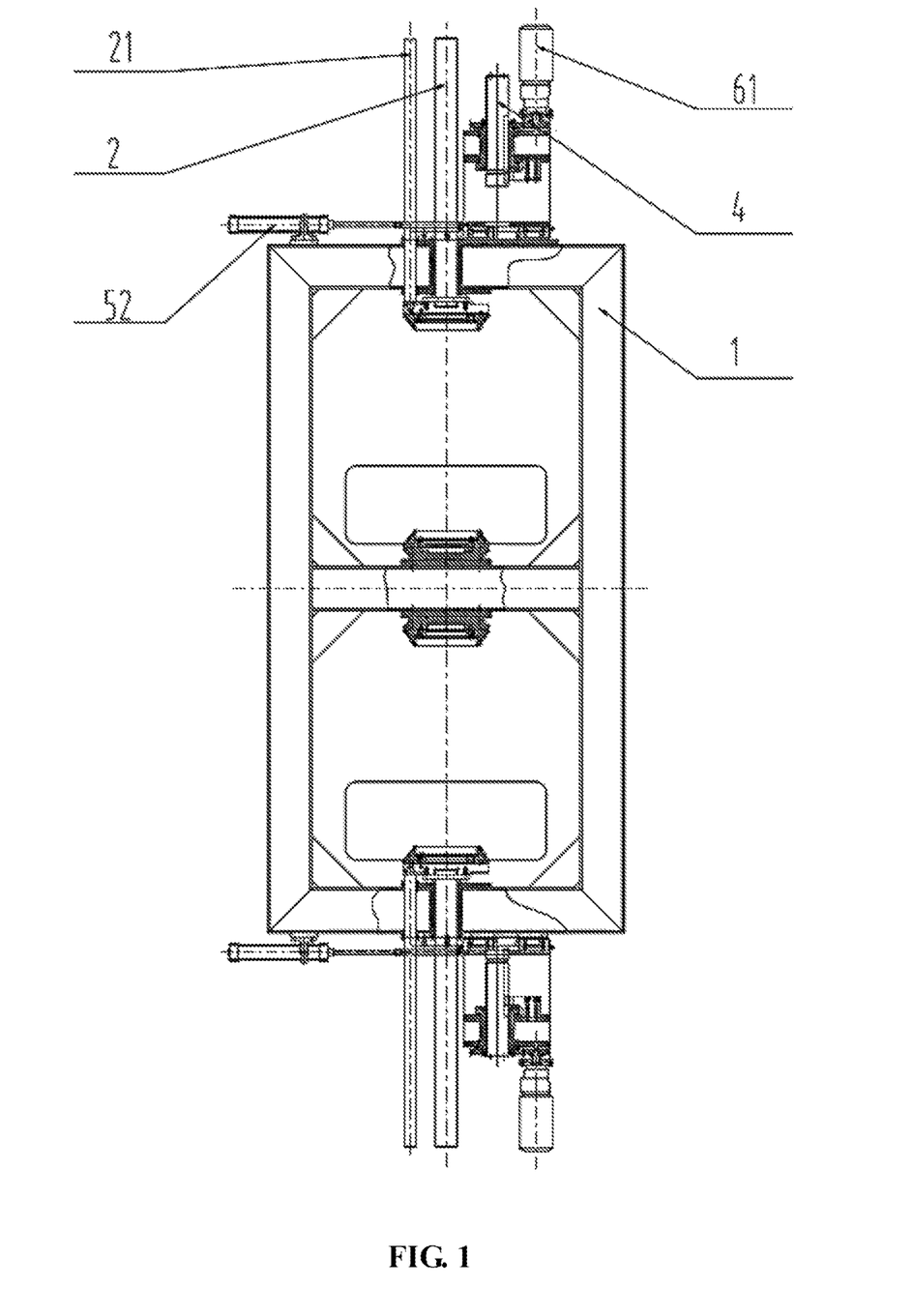
FIG. 1 is a front view illustrating the structure of a tire post-inflation and pressing device when the device is not pressed according to an embodiment of the present application.
Figure 2:
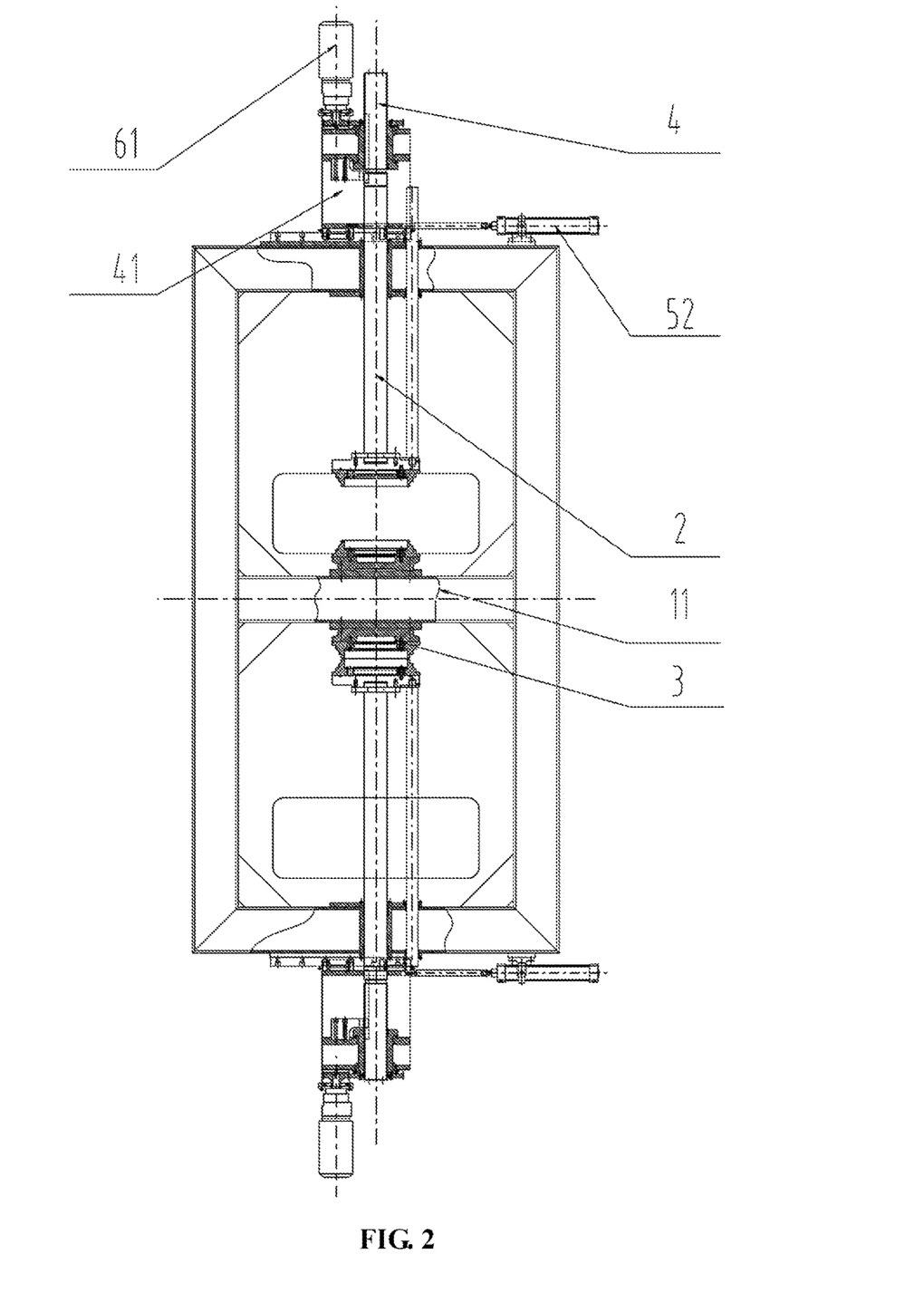
FIG. 2 is a front view illustrating the structure of the tire post-inflation and pressing device when the device is pressed according to an embodiment of the present application.
Figure 3:
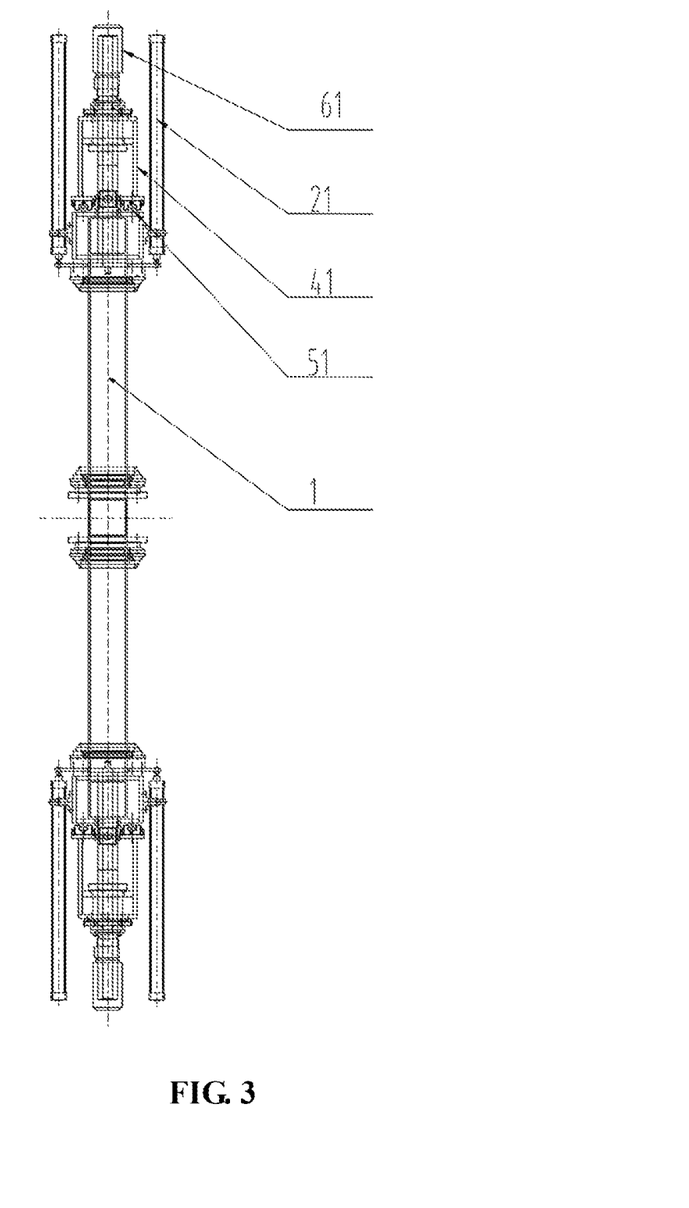
FIG. 3 is a side view illustrating the structure of the tire post-inflation and pressing device according to an embodiment of the present application.

In some embodiments, the mounting base 41 may adopt the following structure scheme. A moving device is disposed below the mounting base 41. As shown in FIGS. 1 to 3, the moving device includes a slide rail 51 and a pulling air cylinder 52. The slide rail 51 is mounted on the framework 1. The pulling air cylinder 52 is mounted on the framework 1 in the width direction. The slide rail 51 is provided with a sliding block. The mounting base 41 is mounted on the sliding block through screws. The pulling air cylinder 52 is horizontally mounted on the framework 1. The output end of the pulling air cylinder 52 is connected to the lower portion of the mounting base 41.

The benefits of adopting the preceding technical solutions are that when the lifting rod 2 moves upwards to replace the tire, the moving device moves the mounting base 41 to the side of the lifting rod 2 to avoid collision between the lifting rod 2 and the pressing rod 4; and after the lifting rod 2 is lowered, the moving device moves the mounting base 41 above the lifting rod 2 and aligns the pressing rod 4 with the lifting rod 2 to press the top of the lifting rod 2.

In some embodiments, the drive assembly may adopt the following structure scheme. As shown in FIG. 4, the drive assembly includes a motor 61, a driving gear 62, and a driven gear 63. The motor 61 is vertically mounted on the mounting base 41. The driving gear 62 is connected to the output end of the motor 61 through a key. The driving gear 62 meshes with the driven gear 63. The driven gear 63 is secured to and mounted on the upper surface of the guide sleeve 42.

The benefits of adopting the preceding technical solutions are that the motor 61 is configured to drive the driving gear 62 and the driven gear 63 to rotate and then drive the guide sleeve 42 to rotate; the pressing rod 4 is driven to move up and down in the mounting base 41; and the position of the pressing rod 4 is conveniently controlled through the driving mode of the motor 61 and gears, so that the pressing rod 4 reaches a pressing position, thereby ensuring that the size of the inflated tire is qualified.

In some embodiments, the pressing rod 4 may adopt the following structure scheme. As shown in FIG. 5, the pressing rod 4 is a hollow rod and sleeves the lifting rod 2. A mounting plate 71 is disposed below the pressing rod 4. A moving air cylinder 72 is mounted on a side of the mounting plate 71. The output end of the moving air cylinder 72 is provided with a pressing plate 73. The pressing plate 73 and the mounting plate 71 are disposed adjacent to each other. The pressing plate 73 is driven by the moving air cylinder 72 to presses the lifting rod 2.

The benefits of adopting the preceding technical solutions are that the pressing rod 4 is configured as a hollow rod, so that the lifting rod 2 moves in the pressing rod 4; and there is no need to move the mounting base 41, and when the lifting rod 2 needs to be pressed, the moving air cylinder 72 only needs to move the lower pressing surface 75 on the pressing plate 73 above the lifting rod 2.

Figure 6:
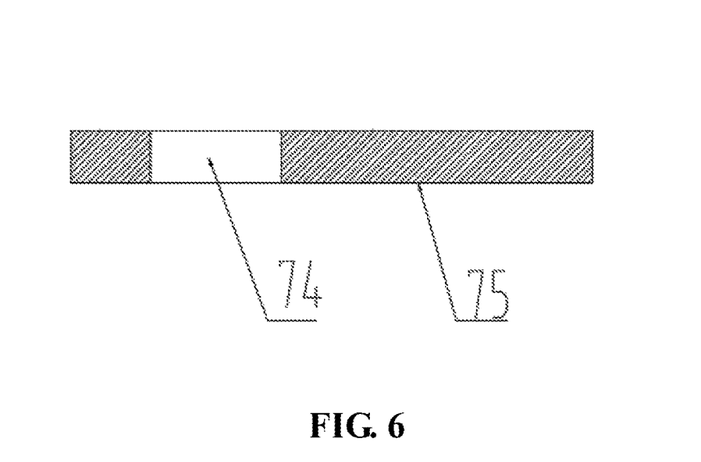
FIG. 6 is a diagram illustrating the structure of a pressing plate according to an embodiment of the present application.

In some embodiments, the pressing plate 73 may adopt the following structure scheme. The pressing plate 73 is provided with a through hole 74 for passing through the lifting rod 2. A side of the through hole 74 is provided with a lower pressing surface 75. The lower pressing surface 75 is disposed on the lower surface of the pressing plate 73.

The benefits of adopting the preceding technical solutions are that when the lifting rod 2 needs to rise, the lifting rod 2 passes through the through hole 74; and after the lifting rod 2 is lowered into place, the moving air cylinder 72 pulls the pressing plate 73 horizontally, and then the lower pressing surface 75 presses the lifting rod 2.

In some embodiments, as shown in FIG. 3, the pressing assembly and the lifting rod 2 may adopt the following structure scheme. The top and the bottom of the tire post-inflation device are each symmetrically provided with the pressing assembly and the lifting rod 2.

The benefit of adopting the preceding technical solution is that two tires may be inflated and pressed at one time due to the top of the tire post-inflation device and the bottom of the tire post-inflation device are symmetrically arranged, so that the processing efficiency of the post-inflation device is improved.

Figure 7:
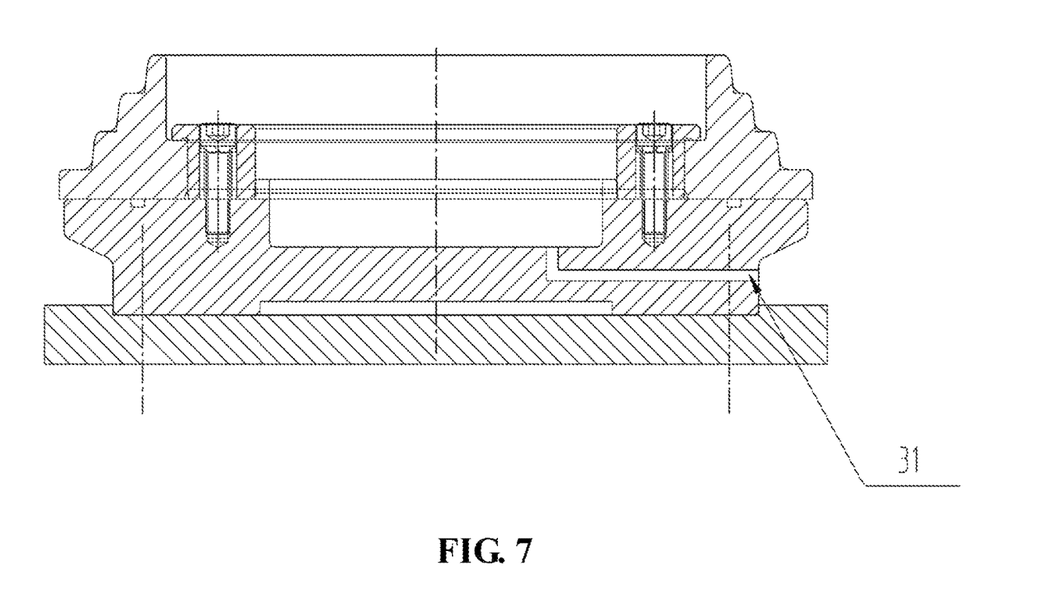
FIG. 7 is a diagram of the position of an inflation hole.

In some embodiments, as shown in FIGS. 2 and 7, the chuck assembly 3 may adopt the following structure scheme. The chuck assembly 3 is divided into an upper chuck and a lower chuck. The upper chuck is connected to the lifting rod 2. The upper chuck can move up and down driven by the lifting rod 2. The lower chuck is secured to and disposed on the beam 11 in the framework. The inflation port 31 is formed in the lower chuck and is connected to an external air source to inflate the tire.

During the working process, first, an external device places a to-be-processed tire on the lower chuck on the beam 11. Then, the lifting rod 2 drives the upper chuck in the chuck assembly 3 to lower and cooperate with the lower chuck to press and secure the tire. After the upper chuck is lowered into place, the air cylinder 52 is pulled to pull the mounting base 41, so that the mounting base 41 is moved above the lifting rod 2 (if the pressing rod 4 is a hollow rod, the moving air cylinder 72 moves the lower pressing surface 75 of the pressing plate 73 above the lifting rod 2). The pressing rod 4 is lowered under the drive of the drive assembly. The lifting rod 2 is pressed and kept pressed for a period of time. After the tire is inflated and shaped, the pressing rod 4 rises, and then the lifting rod 2 rises. The external device takes away the processed tire and places a to-be-processed tire to continue processing.

What is claimed is:

1. A tire post-inflation device, comprising:
   a framework;
   a lifting rod disposed on the framework;
   a chuck assembly connected to a lower end of the lifting rod, wherein the chuck assembly is formed with an inflation port for inflating a tire;
   lifting drive cylinders disposed on two sides of the lifting rod, wherein the lifting drive cylinders are configured to drive the lifting rod to move up and down; and
   a pressing assembly disposed on the framework, wherein the pressing assembly comprises a pressing rod and a drive assembly, and the drive assembly is configured to drive the pressing rod to press the lifting rod that is lowered into place, wherein the pressing assembly further comprises a mounting base and a guide sleeve, and wherein the mounting base is disposed on the framework, the guide sleeve is rotatably disposed on the mounting base, the guide sleeve is provided with threads, the pressing rod is disposed in the guide sleeve, the pressing rod is provided with threads that match the guide sleeve, and the drive assembly is configured to drive the guide sleeve to rotate to enable the pressing rod to move up and down in the guide sleeve.

2. The tire post-inflation device according to claim 1, wherein a moving device is disposed below the mounting base, the moving device comprises a slide rail and a pulling air cylinder, the slide rail is provided with a sliding block, the mounting base is disposed on the sliding block, the pulling air cylinder is horizontally disposed on the framework, and an output end of the pulling air cylinder is connected to a lower portion of the mounting base.

3. The tire post-inflation device according to claim 1, wherein the drive assembly comprises a motor, a driving gear, and a driven gear, wherein the motor is disposed on the mounting base, the driving gear is disposed on an output end of the motor, the driving gear meshes with the driven gear, and the driven gear is secured to the guide sleeve.

4. The tire post-inflation device according to claim 1, wherein the pressing rod is a hollow rod and sleeves the lifting rod, a mounting plate is disposed below the pressing rod, a moving air cylinder is disposed on a side of the mounting plate, an output end of the moving air cylinder is provided with a pressing plate, and the pressing plate is configured to be driven by the moving air cylinder to press the lifting rod.

5. The tire post-inflation device according to claim 4, wherein the pressing plate is provided with a through hole configured for the lifting rod to pass through, a side of the through hole is provided with a lower pressing surface, and the lower pressing surface is disposed on a lower surface of the pressing plate.

6. The tire post-inflation device according to claim 1, wherein a top of the tire post-inflation device and a bottom of the tire post-inflation device are each symmetrically provided with the pressing assembly and the lifting rod, the pressing assembly on the top of the tire post-inflation device is symmetrically arranged with the pressing assembly on the bottom of the tire post-inflation device, and the lifting rod on the top of the tire post-inflation device is symmetrically arranged with the lifting rod on the bottom of the tire post-inflation device.

* * * * *